United States Patent
Riefe (10) Patent No.: US 9,834,121 B2
(45) Date of Patent: Dec. 5, 2017

(54) TRAY TABLE, STEERING WHEEL HAVING TRAY TABLE, AND VEHICLE HAVING STEERING WHEEL

(71) Applicant: Steering Solutions IP Holding Corporation, Saginaw, MI (US)

(72) Inventor: Richard K. Riefe, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 54 days.

(21) Appl. No.: 14/920,206

(22) Filed: Oct. 22, 2015

(65) Prior Publication Data
US 2017/0113589 A1    Apr. 27, 2017

(51) Int. Cl.
| B60N 3/00 | (2006.01) |
| B60R 21/203 | (2006.01) |
| B62D 1/04 | (2006.01) |
| B62D 1/16 | (2006.01) |
| B62D 1/185 | (2006.01) |

(52) U.S. Cl.
CPC ............ B60N 3/005 (2013.01); B60R 21/203 (2013.01); B62D 1/04 (2013.01); B62D 1/16 (2013.01); B62D 1/185 (2013.01)

(58) Field of Classification Search
CPC .................. B60R 21/055; B60R 21/05; B60R 2021/0233; B62D 1/11
See application file for complete search history.

(56) References Cited

U.S. PATENT DOCUMENTS

| 3,011,802 | A |   | 12/1961 | Ackerman |        |
| 3,643,606 | A |   | 2/1972  | Vise     |        |
| 3,937,101 | A |   | 2/1976  | Wade     |        |
| 4,287,621 | A | * | 9/1981  | Kertz    | B60N 3/00 |
|           |   |   |         |          | 224/276 |
| 4,453,788 | A | * | 6/1984  | Russell  | B60N 3/005 |
|           |   |   |         |          | 108/44 |
| 5,060,581 | A |   | 10/1991 | Malinski |        |
| 5,181,759 | A | * | 1/1993  | Doolittle | B60N 2/466 |
|           |   |   |         |          | 296/153 |

(Continued)

FOREIGN PATENT DOCUMENTS

| DE | 2025003 A    * | 12/1971 |
| DE | 102005053176 A1 | 10/2007 |

(Continued)

OTHER PUBLICATIONS

Dec. 2, 1971, German Patent Office, DE 2 025 003 A, Machine Translation of Description.*

*Primary Examiner* — James A English
(74) *Attorney, Agent, or Firm* — Cantor Colburn LLP (57) ABSTRACT

A tray table includes a deformable body and a pivot portion. The deformable body includes a first edge and a second edge. A substantially planar surface extends from the first edge to the second edge in a first condition of the tray table. The body defines a first length from the first edge to the second edge in the first condition of the table. The body defines a second length of the tray table, shorter than the first length, in a second condition of the tray table upon exposure of the second edge to a force. The pivot portion adjacent the first edge of the body is configured to pivotally attach the body to a steering wheel.

19 Claims, 7 Drawing Sheets

(56) References Cited

U.S. PATENT DOCUMENTS

| | | | |
|---|---|---|---|
| 5,193,777 A | 3/1993 | Faulstich | |
| 5,555,502 A | 9/1996 | Opel | |
| 5,662,047 A * | 9/1997 | Metcalf | B60N 3/005 108/44 |
| 6,227,425 B1 * | 5/2001 | Ware, Sr. | A63B 71/06 224/274 |
| 6,669,233 B2 * | 12/2003 | Gabriel | B60R 21/02 280/731 |
| 7,315,291 B2 * | 1/2008 | Yoshihara | B60R 11/0235 345/1.1 |
| 7,474,204 B2 | 1/2009 | Songwe | |
| 7,611,198 B2 | 11/2009 | Schweizer | |
| 7,775,584 B2 * | 8/2010 | Hughes, Jr. | B60N 2/466 296/1.09 |
| 8,474,860 B2 | 7/2013 | Ohoka et al. | |
| 8,538,628 B2 | 9/2013 | Backman | |
| 9,132,787 B2 | 9/2015 | Cooper | |
| 9,193,375 B2 | 11/2015 | Schramm et al. | |
| 9,442,289 B2 | 9/2016 | Nishima et al. | |
| 9,552,148 B2 | 1/2017 | Kim et al. | |
| 2002/0073899 A1 | 6/2002 | Chen | |
| 2005/0076815 A1 * | 4/2005 | Twyford | G06F 3/0202 108/44 |
| 2006/0146074 A1 | 7/2006 | Harrison | |
| 2007/0099465 A1 | 5/2007 | Ruetz | |
| 2007/0205875 A1 | 9/2007 | De Haan | |
| 2012/0074674 A1 | 3/2012 | Ohoka et al. | |
| 2012/0287050 A1 | 11/2012 | Wu | |
| 2013/0002416 A1 * | 1/2013 | Gazit | B62D 1/28 340/438 |
| 2014/0195096 A1 | 7/2014 | Schliep et al. | |
| 2015/0283926 A1 * | 10/2015 | Hamdoon | B60N 2/4235 297/411.21 |
| 2016/0001807 A1 | 1/2016 | Hans et al. | |
| 2016/0114770 A1 | 4/2016 | Lombrozo | |
| 2016/0200344 A1 | 7/2016 | Sugioka et al. | |
| 2016/0244070 A1 | 8/2016 | Bendewald et al. | |
| 2016/0304123 A1 | 10/2016 | Lewis et al. | |
| 2016/0325662 A1 * | 11/2016 | Nash | B62D 1/04 |
| 2016/0368522 A1 | 12/2016 | Lubischer et al. | |
| 2016/0375924 A1 | 12/2016 | Bodtker | |
| 2016/0375926 A1 * | 12/2016 | Lubischer | B62D 1/183 74/493 |
| 2016/0375927 A1 | 12/2016 | Schulz et al. | |

FOREIGN PATENT DOCUMENTS

| | | |
|---|---|---|
| DE | 102010050699 A1 | 8/2011 |
| DE | 102016001257 A1 | 9/2016 |

* cited by examiner

TRAY TABLE, STEERING WHEEL HAVING TRAY TABLE, AND VEHICLE HAVING STEERING WHEEL

BACKGROUND OF THE INVENTION

The following description relates to steering wheels and, more specifically, to a tray table for a steering wheel.

Vehicle steering wheels are typically mounted to an end of a steering shaft connected to a steering gear and road wheels. A driver operates the steering wheel to turn the road wheels by transmitting torque to the steering gear through the steering shaft. Alternatively, in a steer-by-wire system, a number of mechanical components between the steering wheel and the road wheels of the vehicle are replaced with electrical components such that the rotation of the steering wheel by a driver generates command signals for actuators to turn the road wheels. In either case, the driver manipulates the steering wheel.

If the vehicle is fitted with an autonomous driving assist steering ("ADAS") system, the steering wheel need not be manipulated by a driver when the ADAS system is activated. Accordingly, it is desirable to provide additional uses for a vehicle steering wheel when not in use by a driver.

BRIEF SUMMARY OF THE INVENTION

A tray table includes a deformable body and a pivot portion. The deformable body includes a first edge and a second edge. A substantially planar surface extends from the first edge to the second edge in a first condition of the tray table. The body defines a first length from the first edge to the second edge in the first condition of the table. The body defines a second length of the tray table, shorter than the first length, in a second condition of the tray table upon exposure of the second edge to a force. The pivot portion adjacent the first edge of the body is configured to pivotally attach the body to a steering wheel.

A steering column assembly includes a steering wheel and a tray table pivotally attached to the steering wheel. The tray table includes a deformable body and a pivot portion. The deformable body includes a first edge and a second edge. A substantially planar surface extends from the first edge to the second edge in a first condition of the tray table. The body defines a first length from the first edge to the second edge in the first condition of the table. The body defines a second length of the tray table, shorter than the first length, in a second condition of the tray table upon exposure of the second edge to a force. The pivot portion adjacent the first edge of the body is configured to pivotally attach the body to a steering wheel.

A vehicle includes a steering column, a steering wheel attached to one end of the steering column, and a tray table pivotally attached to the steering wheel. The tray table includes a deformable body and a pivot portion. The deformable body includes a first edge and a second edge. A substantially planar surface extends from the first edge to the second edge in a first condition of the tray table. The body defines a first length from the first edge to the second edge in the first condition of the table. The body defines a second length of the tray table, shorter than the first length, in a second condition of the tray table upon exposure of the second edge to a force. The pivot portion adjacent the first edge of the body is configured to pivotally attach the body to a steering wheel.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, FIG. 1 discloses an embodiment of a steering column assembly 14 having a steering column 16 extending generally along a longitudinal axis 12. A steering input device 18 is attached to the steering column 16 for driver operated steering of a vehicle 10 (see FIG. 9). In the illustrated embodiments, the steering input device 18 is a steering wheel, and will be hereinafter referred to as steering wheel 18. The steering wheel 18 includes a hub 24, a rim portion 26, and spokes 28 connecting the hub 24 to the rim portion 26. The steering wheel 18 may be equipped with an inflatable bag 30, for deployment during a crash event. The inflatable bag 30 is shown in a non-deployed condition in FIGS. 1-3, and in a deployed condition in FIG. 4, indicative of a crash event such as a collision of the vehicle 10.

The steering column assembly 14 further includes a tray table 32 pivotally attached to the steering wheel 18. In the deployed position of the tray table 32 shown in FIG. 1, an occupant of the vehicle 10 may utilize a working surface 34 of the tray table 32 to place an object for use. The object may include, but is not limited to, a laptop, reading material, a tablet, food, etc. The working surface 34 may be substantially planar as illustrated for adequately supporting the object. However, the working surface may include a shallow dish shape and may include peripheral edges protruding therefrom to prevent objects from sliding off of the working surface 34 during turns of the vehicle 10. As illustrated in FIG. 1, the working surface 34 may extend substantially parallel to the longitudinal axis 12 of the shaft 16 when in the deployed condition of the tray table 32, however, the tray table 32 may be angled at various angles to accommodate the needs of the occupant. In a first condition of the tray table 32, as shown in FIGS. 1 and 2, the tray table 32 has a first length L1 extending from a first edge 36 to a second edge 38 of the tray table 32. The tray table 32 further includes a hinge area or pivot portion 40 adjacent the first edge 36 to pivotally secure the tray table 32 to the steering wheel 18. Likewise, the steering wheel 18 includes a hinge area or pivot portion 42 to pivotally accommodate the tray table 32 thereto. The pivot portions 40, 42 are provided at substantially six o'clock positions of the steering wheel 18 and tray table 32 (when viewing the tray table 32 in the stowed position shown in FIG. 2) so that the tray table 32 can be rotated away from the hub 24 in rotational direction 44 (FIG. 1) to a horizontal position in front of the occupant. The cooperating pivot portions 40, 42 enable the tray table 32 to move between the deployed position shown in FIG. 1 and the stowed position shown in FIG. 2 by rotating the tray table 32 in either the rotational directions 44, 52 as shown about a pivot axis 46 passing through the pivot portions 40, 42.

Figure 4:
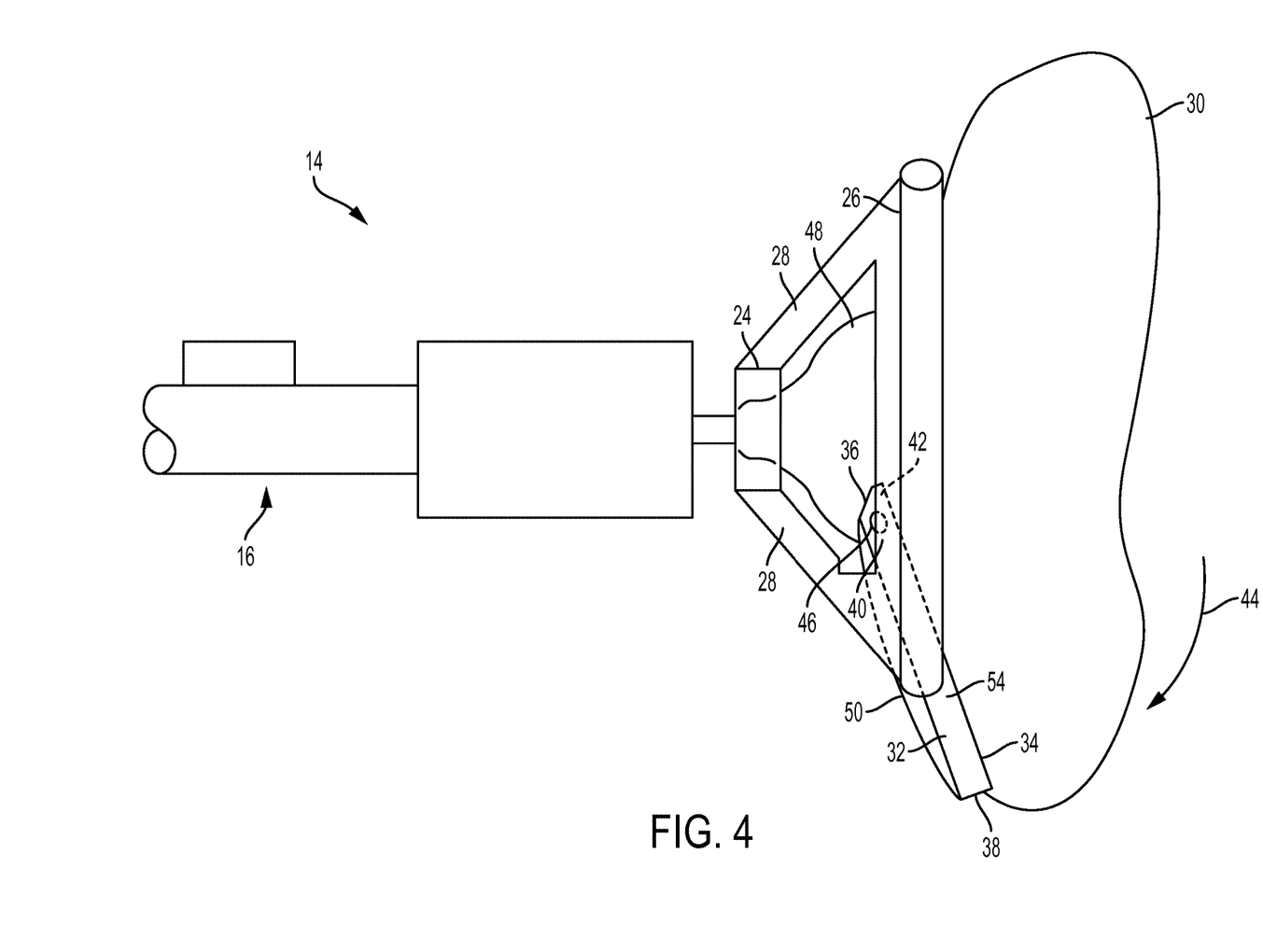
FIG. 4 is side view of the steering column assembly of FIG. 1 with an inflatable air bag in a deployed condition.

In the stowed position, the working surface 34 may cover a surface of the hub 24, or may face a receiving area 48 of the steering wheel 18. In the stowed position, an outer face 50 faces a passenger, such as the driver, seated in the driver's seat. The outer surface 50 may be designed to aesthetically coordinate with the appearance of the steering wheel 18. The tray table 32 in the stowed position does not impede with the inflation of the driver's air bag 30 because the pivot portions 40, 42 allow the inflatable bag 30 to rotate the tray table 32 away from the receiving area 48 of the steering wheel 18, in rotational direction 44, as shown in FIG. 4. As high pressure gas deploys the inflatable bag 30 out of the hub 24, a radial force generated by the gas in the inflatable bag 30 rotates the tray table 32 in the direction 44 towards the rim portion 26 near a six o'clock orientation and generally out of the way before a driver can contact the tray table 32. The tray table 32 may include a catch or support that is capable of supporting the tray table 32 in a normal deployed position shown in FIG. 1, (or alternate angular positions to suit the needs of the driver), but which can be overcome by the force of the inflating inflatable airbag 30 to move the tray table 32 to the position shown in FIG. 4.

Figure 1:
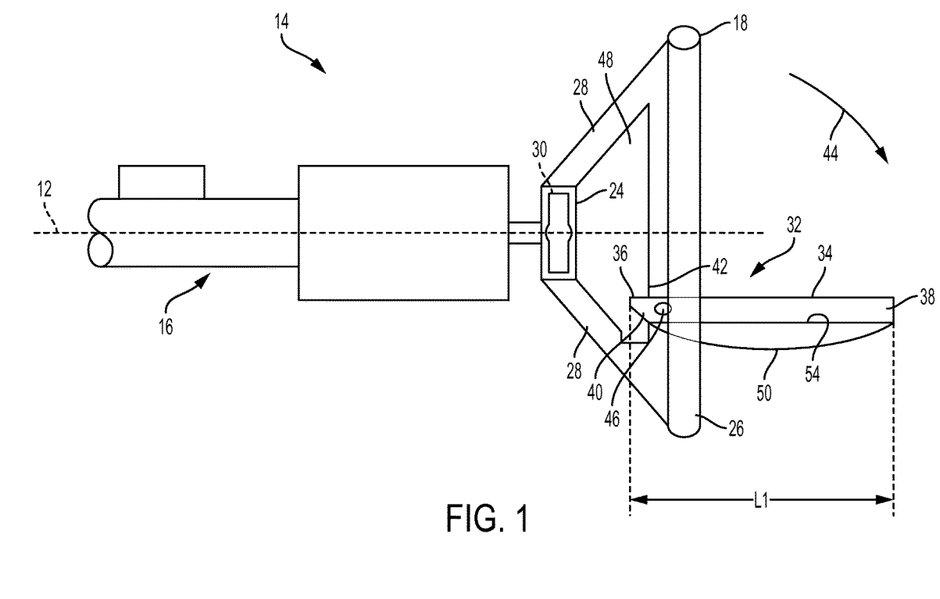
FIG. 1 is a side view of an embodiment of a steering column assembly including an embodiment of a tray table in a deployed position.
Figure 2:
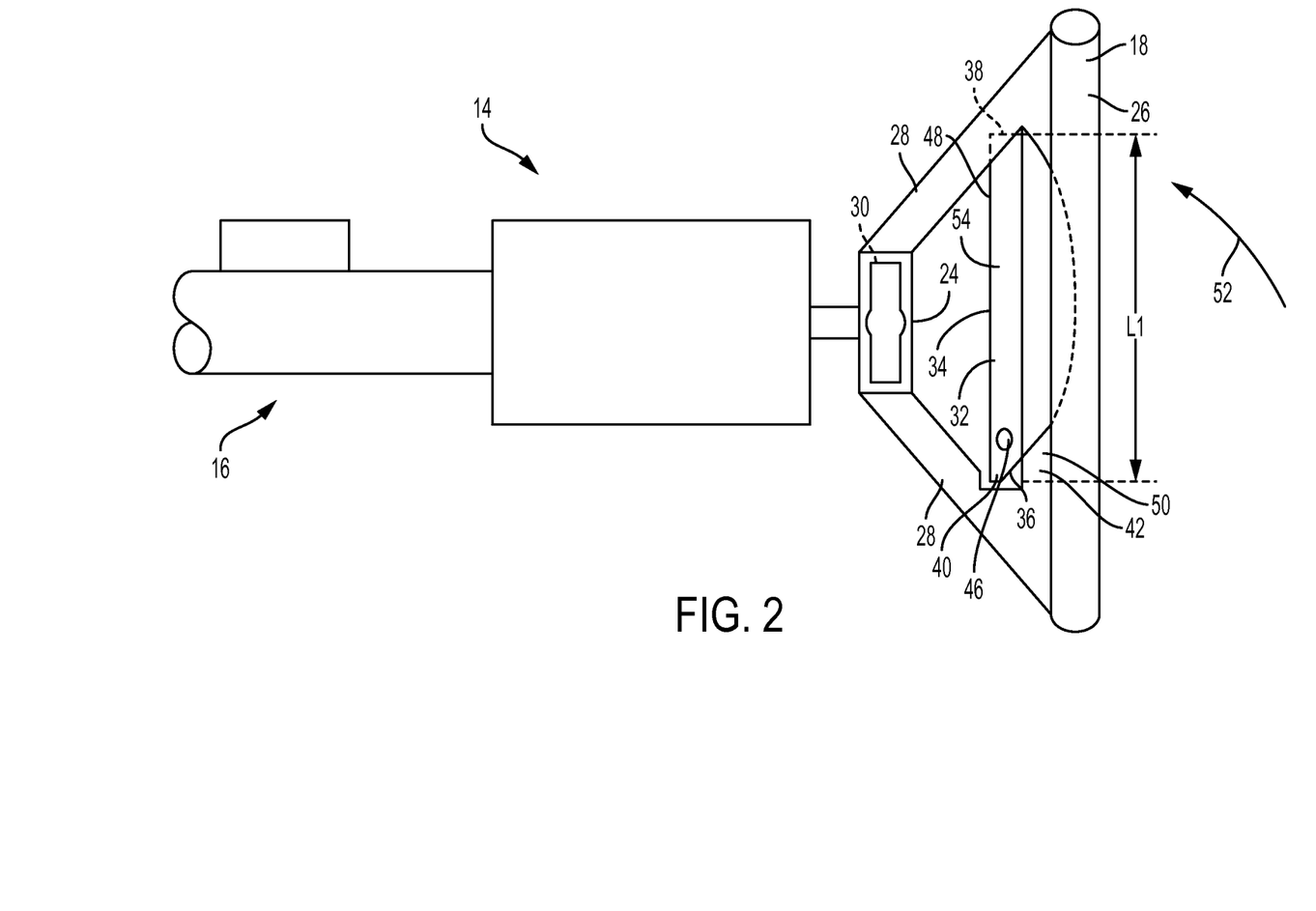
FIG. 2 is a side view of the steering column assembly of FIG. 1 with the tray table in a stowed position.

As will be further described with respect to FIGS. 5-8, the tray table 32 includes a deformable body 54 so that, if the tray table 32 is in the deployed position shown in FIG. 1 and the vehicle 10 experiences a collision, and if a driver's torso contacts the second edge 38 of the tray table 32 during the collision, the tray table 32 will alter and thus deform at a very low level of force to substantially reduce the impact to the driver by the tray table 32. The inflatable bag 30 may also be deployed in a collision. If the tray table 32 is in the deployed position shown in FIG. 1 when the inflatable bag 30 is deployed, then the tray table 32 will be forced to rotate to the position shown in FIG. 4. While this may occur prior to the driver engaging with the second edge 38 of the tray table 32, any potential contact between the tray table 32 and the driver before the inflatable bag 30 rotates the tray table 32 to the six o'clock position will be minimized due to the deformable body 54.

Figure 3:
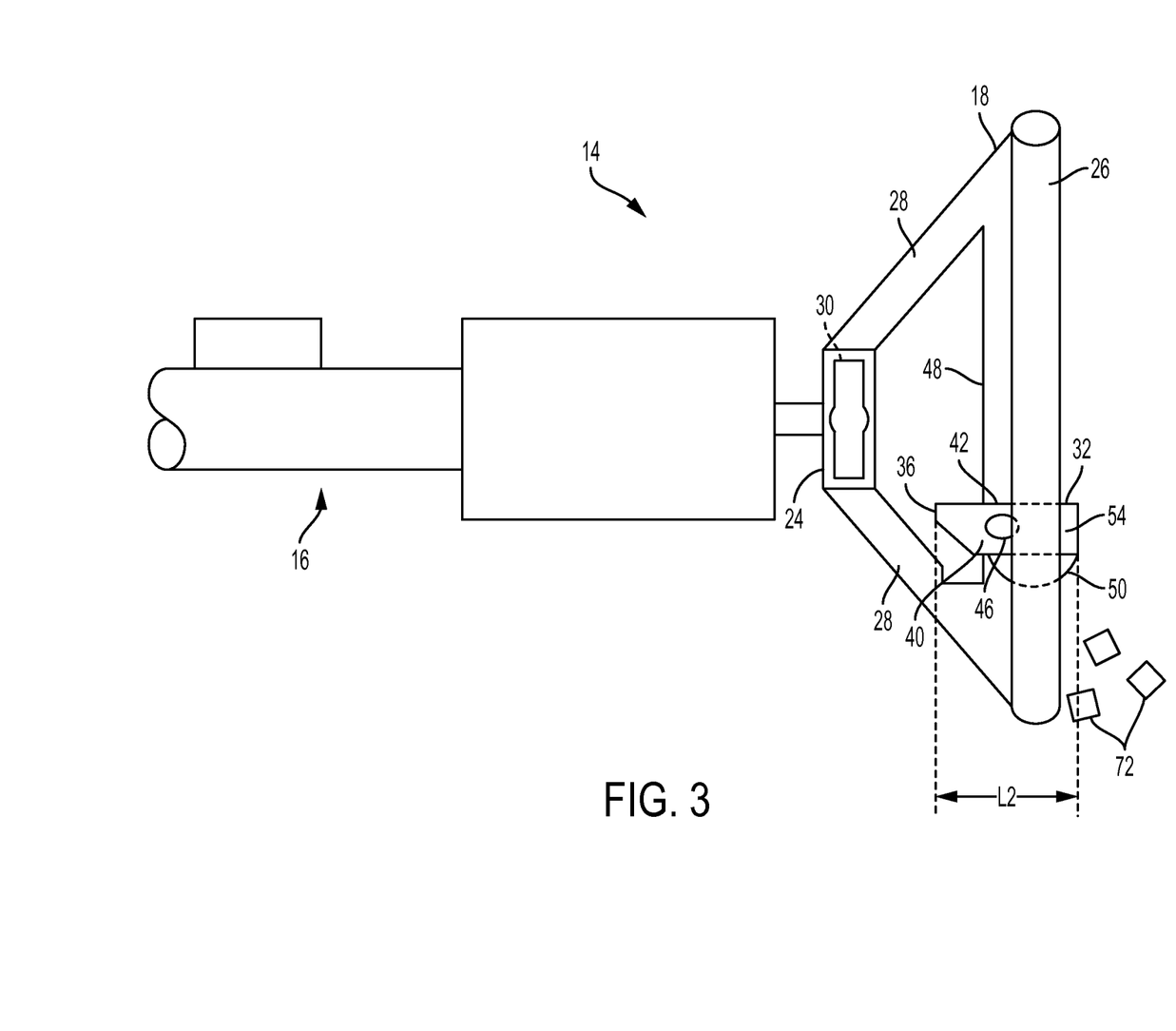
FIG. 3 is a side view of the steering column assembly of FIG. 1 with the tray table in an altered condition.
Figure 5:
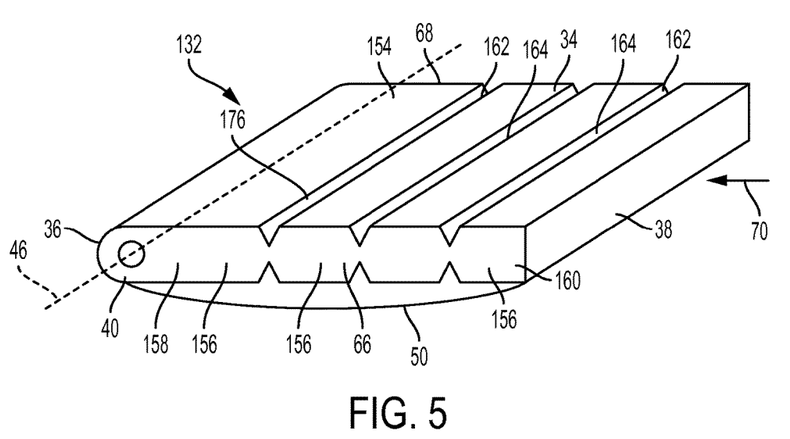
FIG. 5 is a perspective view of one embodiment of the tray table.

One embodiment of tray table 132 is shown in FIG. 5. The tray table 132 includes a body 154 having a plurality of sub-sections 156 that extend substantially parallel to each other, with a first subsection 158 aligned with the first edge 36, a second subsection 160 aligned with the second edge 38, and at least one divider 162 positioned between the first and second subsections 158, 160 and between the first and second edges 36, 38. When the tray table 132 has a rectangular shape as illustrated, the sub-sections 156 are further arranged to be substantially parallel with the first and second edges 36, 38. The illustrated embodiment includes a plurality of dividers 162. In FIG. 5, the dividers 162 include shear lines 164 that extend from opposing third and fourth edges 66, 68 of the body 154. The shear lines 164 may also be substantially parallel to each other. The body 154 may be substantially hollow such that the force in direction 70 will separate at least some of the subsections 156 from each other. Body pieces 72 are demonstrated in FIG. 3 as a result of the force in direction 70. The tray table 132 in the second condition as shown in FIG. 3 has a second length L2 from the first edge 36 to the altered second edge 74, where second length L2 is shorter than the first length L1. The altered second edge 74 of the tray table 32 in FIG. 3 may be an edge 176 of an interior subsection 156 as shown in FIG. 5. Other than the distinctions noted above, the tray table 132 may incorporate the same or substantially the same features and operations of the tray table 32 shown in FIGS. 1-4.

Figure 6:
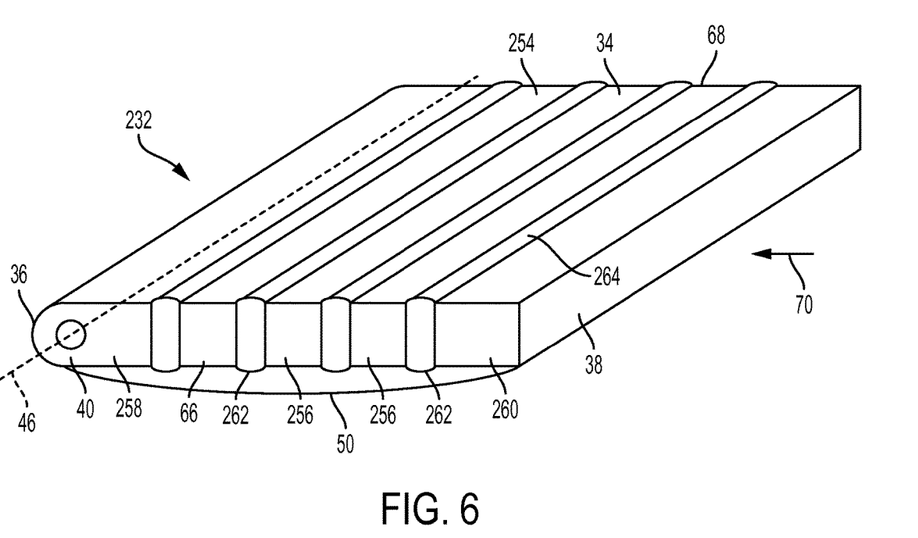
FIG. 6 is a perspective view of another embodiment of the tray table.

Another embodiment of the tray table 232 is shown in FIG. 6. The tray table 232 includes a body 254 having a plurality of sub-sections 256 that extend substantially parallel to each other, with a first subsection 258 aligned with the first edge 36, a second subsection 260 aligned with the second edge 38, and at least one divider 262 positioned between the first and second subsections 258, 260 and between the first and second edges 36, 38. When the tray table 232 has a rectangular shape as illustrated, the sub-sections 256 are further arranged to be substantially parallel with the first and second edges 36, 38. The illustrated embodiment includes a plurality of dividers 262. In FIG. 6, the dividers 262 are collapsible convolutions 264 that extend from opposing third and fourth edges 66, 68 of the body 254. The convolutions 264 may also be substantially parallel to each other. The convolutions 264 may take the form of a corrugated substrate disposed between the working surface 34 and the outer surface 50. The body 254 may be substantially hollow such that the force in direction 70 will collapse the subsections 256 into each other, "accordion" style. That is, each of the sub-sections 256 will experience a reduction in width to alter the length of the body 254 to the second length L2 as shown in FIG. 3. For the body 254, pieces need not be sheared off and the body 254 remains integral, yet substantially deformed as a result of the force. The tray table 232 in the second condition as shown in FIG. 3 has a second length L2 from the first edge 36 to the altered second edge 74, where the second length L2 is shorter than the first length L2. In this embodiment, the second edge 74 is a deformed version of second edge 38. Other than the distinctions noted above, the tray table 232 may incorporate the same or substantially the same features and operations of the tray table 32 shown in FIGS. 1-4.

Figure 7:
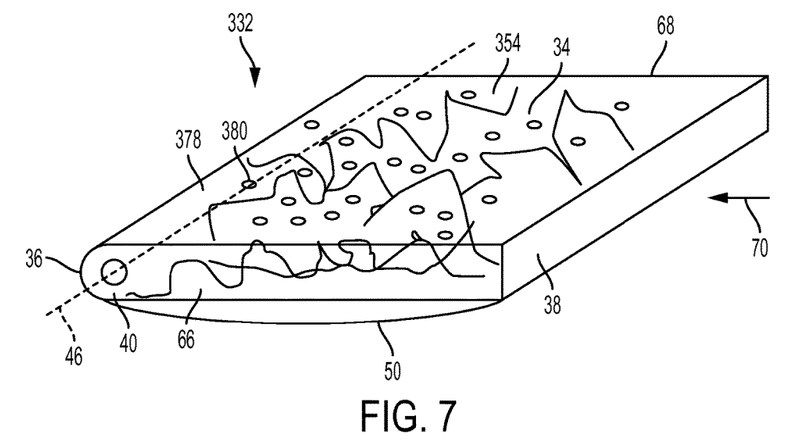
FIG. 7 is a perspective view of still another embodiment of the tray table.

Another embodiment of the tray table 332 is shown in FIG. 7. The tray table 332 includes a body 354 made of a crushable material 378, such as, but not limited to crushable foam. The material 378 may include pockets 380 of air that may be partially or substantially eliminated when the force in direction 70 is impacted on the body 354. Further, in one embodiment, the body 354 may also be substantially hollow such that the material 378 is used to form a shell. However the body 354 may also be made in a solid construction with the material 378 substantially filling an interior of the body 354. The force in direction 70 may at least partially crush the material 378 of the body 354, such as due in part to the air pockets therein. However, the force in direction 70 may also break up the material 378 of the body 354 into separate pieces 72 as demonstrated in FIG. 3, to at least partially disintegrate the tray table 332. The tray table in the second condition as shown in FIG. 3 thus has a second length L2 from the first edge 36 to the altered second edge 74 that is shorter than the first length L1. The altered second edge 74 of the tray table 332 in FIG. 3 may be any remaining portion of the material 378 of the body 354 shown in FIG. 7. Other than the distinctions noted above, the tray table 332 may incorporate the same or substantially the same features and operations of the tray table 32 shown in FIGS. 1-4.

Figure 8:
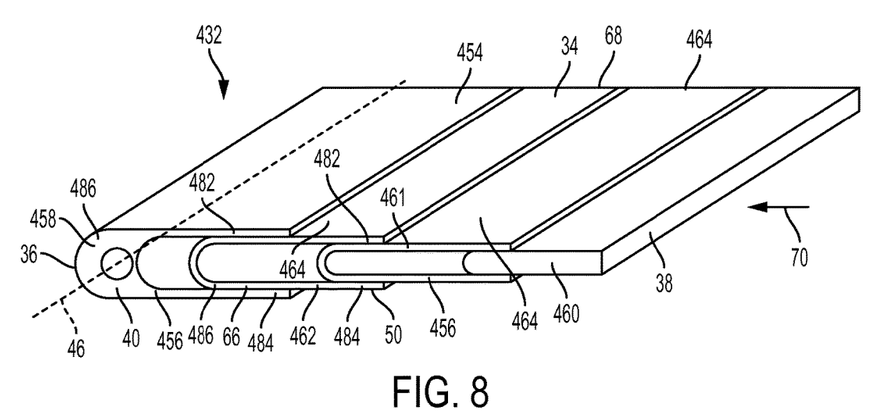
FIG. 8 is a perspective view of yet another embodiment of the tray table; and, FIG. 9 is a schematic view of a vehicle including the steering column assembly of FIG. 1.

Another embodiment of the tray table 432 is shown in FIG. 8. The tray table 432 includes a body 454 having a plurality of sub-sections 456 that extend substantially parallel to each other, with a first subsection 458 aligned with the first edge 36, a second subsection 460 aligned with the second edge 38, and at least one divider 462 positioned between the first and second subsections 458, 460 and between the first and second edges 36, 38. When the tray table 432 has a rectangular shape as illustrated, the sub-sections 458, 460 are further arranged to be substantially parallel with the first and second edges 36, 38. The illustrated embodiment includes a plurality of dividers 462. In FIG. 8, both the sub-sections 456 and the dividers 462 are nested telescoping elements 464 that extend from opposing third and fourth edges 66, 68 of the body 454. While the first sub-section 458 is depicted to receive an adjacent divider 462 therein, which in turn is depicted to receive an adjacent third sub-section 461 therein, which in turn is depicted to receive the second sub-section 460 therein, any number of nested telescoping elements 464 may be employed. Further, the arrangement of nested telescoping elements 464 may be reversed such that the second sub-section 460 adjacent the second edge 38 is the largest telescoping element 464 with each subsequent adjacent telescoping element 464 sized for receiving the next adjacent telescoping element 464. The nested telescoping elements 464 may also be substantially parallel to each other. The telescoping elements 464 may each include a U-shaped cross-section with first and second legs 482, 484 forming portions of the working surface 34 and outer surface 50, respectively, and connecting portions 486 extending parallel to other connecting portions 486. Upon a force in direction 70, the telescoping elements 464 will nest (collapse) into each other to alter the length of the body 432 to the second length L2 as shown in FIG. 3. For the body 454, pieces need not be sheared off and the body 454 remains an integral unit, yet deformed to have the second length L2 as a result of the force in direction 70. Thus, the tray table 432 in the second condition as shown in FIG. 3 has a second length L2 from the first edge 32 to the second edge 74, and the length L2 is shorter than the first length L1. In this embodiment, the second edge 74 may be the same as second edge 38. Other than the distinctions noted above, the tray table 432 may incorporate the same or substantially the same features and operations of the tray table 32 shown in FIGS. 1-4.

Figure 9:
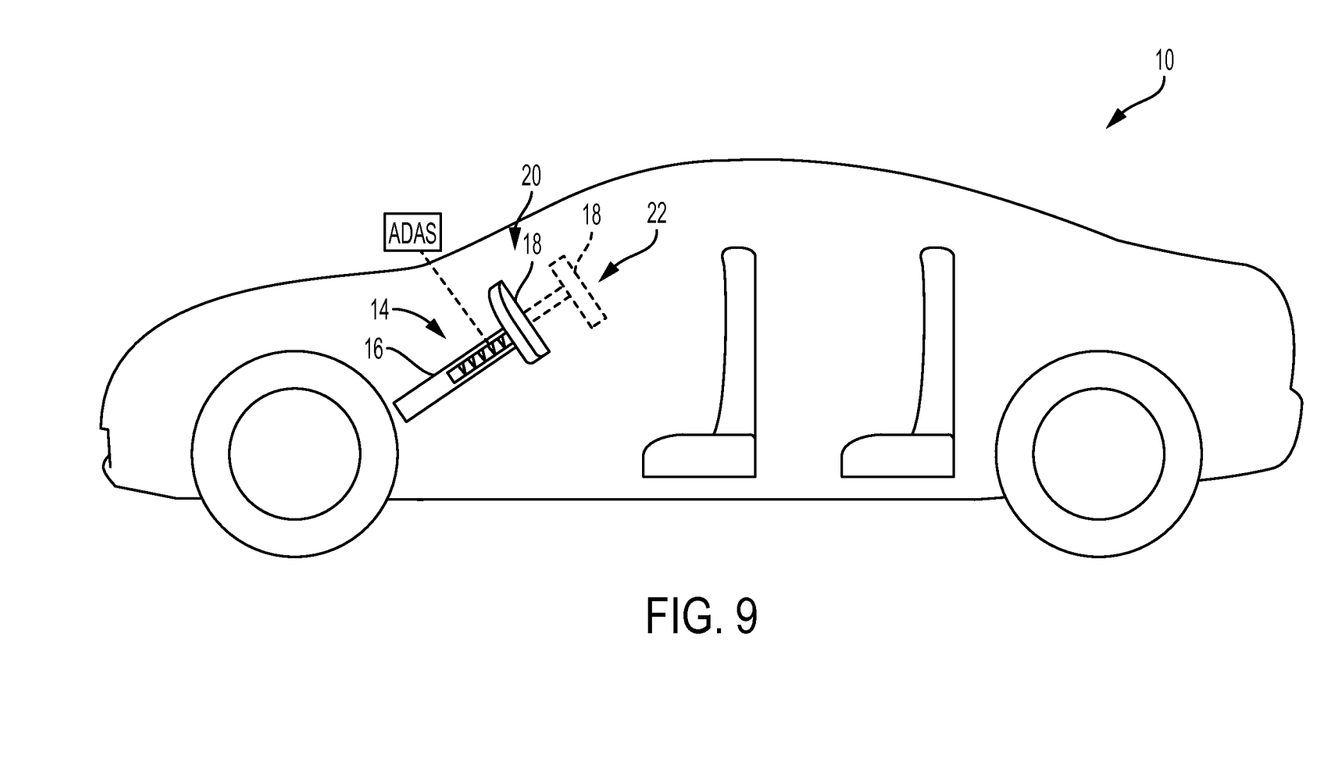

FIG. 9 shows a schematic embodiment of the vehicle 10 in which the steering column assembly 14 having the steering wheel 18 may be employed. The vehicle 10 may be an autonomous driving assisted steering ("ADAS") equipped vehicle. The steering wheel 18 may thus be virtually or literally "un-coupled" from the steering shaft 16 so that it no longer rotates while the ADAS system is activated. This un-coupling may be mechanically or electrically caused by, but not limited to, a clutch, or by a steer-by-wire system, or counter-rotated by a servo-actuator. The un-coupling allows the steering column assembly 14 to be retractable. That is, the steering column 16 and steering wheel 18 may be displaced forward in the vehicle 10 to a retracted position 20 because it is no longer being used by the driver to guide the vehicle 10. The retracted position 20 enlarges the driver's personal space for comfort and convenience. The steering column assembly 14 may be movable between the retracted position 20, and a deployed or driving position 22. In the driving position 22, steering wheel 18 may be used by a driver to steer the vehicle 10. In the retracted position 20, portions of assembly 14, such as steering wheel 18, are disposed away from the driver, which provides increased space for the driver. The displacement of the steering column 16 and wheel 18 in retracted position 20 creates additional cabin space for the driver's comfort and convenience to perform non-driving activities including, but not limited to, reading, working, entertaining, eating, texting, etc. The non-rotating steering wheel 18 in the retracted position 20 enables use of the tray table 32 by maintaining the working surface 34 at the horizontal position shown in FIG. 1. However, some embodiments of the vehicle 10 may enable use of the tray table 32 in the driving position 22, such as when the vehicle 10 is stationary and the steering wheel 18 is not rotating, if space is allotted between the steering wheel 18 and the driver to interpose the tray table 32 therebetween.

In the embodiments described herein, the first length L1 of the tray table 32 in the deployed condition is unsustainable in a crash event, even with very limited force acting on the second edge 38 in direction 70. Thus, the length of the tray table 32 is easily and quickly reduced to a second length L2 to limit the impact to the driver.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A tray table comprising:
   a deformable body having a first edge and a second edge, the body including a substantially planar surface extending from the first edge to the second edge in a first condition of the tray table, the body further including a plurality of sub-sections in the first condition, with a first subsection substantially aligned with the first edge, a second subsection substantially aligned with the second edge, and at least one divider positioned between the first and second subsections and the first and second edges, the body defining a first length from the first edge to the second edge in the first condition of the table, the body defining a second length of the tray table, shorter than the first length, in a second condition of the tray table upon exposure of the second edge to a force which collapses or separates the subsections; and
   a pivot portion adjacent the first edge of the body and configured to pivotally attach the body to a steering wheel.

2. The tray table of claim 1, wherein the body is substantially hollow.

3. The tray table of claim 1, wherein the substantially planar surface includes a plurality of shear lines interposed between adjacent sub-sections.

4. The tray table of claim 1, wherein the body comprises a plurality of convolutions interposed between adjacent sub-sections.

5. The tray table of claim 1, wherein the plurality of sub-sections includes a plurality of nestable telescoping elements.

6. A steering column assembly comprising:
a steering wheel; and,
a tray table pivotally attached to the steering wheel, the tray table including a deformable body having a first edge and a second edge, the body including a substantially planar surface extending from the first edge to the second edge in a first condition of the tray table, the body defining a first length from the first edge to the second edge in the first condition of the table, the body defining a second length of the tray table, shorter than the first length, in a second condition of the tray table upon exposure of the second edge to a force;
wherein the tray table is foldable into the steering wheel.

7. The steering column assembly of claim 6, wherein the steering wheel includes a hub and a receiving area, the surface of the tray table is a working surface configured to support an object in a deployed condition of the tray table, and the working surface of the tray table faces the receiving area in a stowed condition of the tray table.

8. The steering column assembly of claim 6, further comprising an inflatable bag within the steering wheel, wherein the body of the tray table is pivotal upon a force from inflating the inflatable bag.

9. The steering column assembly of claim 6, wherein the body comprises a plurality of sub-sections substantially parallel to each other.

10. The steering column assembly of claim 6, wherein the body includes a plurality of sub-sections, the substantially planar surface includes a plurality of shear lines interposed between adjacent sub-sections, and exposure of the second edge to the force separates at least some of the sub-sections from each other.

11. The steering column assembly of claim 6, wherein the body comprises a plurality of sub-sections and a plurality of convolutions interposed between adjacent sub-sections, and exposure of the second edge to the force collapses at least some of the sub-sections into each other.

12. The steering column assembly of claim 6, wherein the body comprises a plurality of sub-sections including a plurality of nestable telescoping elements, and exposure of the second edge to the force collapses at least some of the sub-sections into each other.

13. The steering column assembly of claim 6, wherein the body includes a crushable foam material.

14. A vehicle comprising:
a steering column;
a steering wheel attached to one end of the steering column; and,
a tray table pivotally attached to the steering wheel and foldable into the steering wheel, the tray table including a deformable body having a first edge and a second edge, the body including a substantially planar surface extending from the first edge to the second edge in a first condition of the tray table, the body defining a first length from the first edge to the second edge in the first condition of the table, the body defining a second length of the tray table, shorter than the first length, in a second condition of the tray table upon exposure of the second edge to a force.

15. The vehicle of claim 14, further comprising an autonomous driving assisted steering system, the steering wheel rotating the steering column in a non-activated condition of the autonomous driving assisted steering system, and the steering wheel fixed from rotation in an activated condition of the autonomous driving assisted steering system.

16. The vehicle of claim 14, wherein the steering wheel includes a hub and a receiving area, the surface of the tray table is a working surface configured to support an object in a deployed condition of the tray table, and the working surface of the tray table faces the receiving area in a stowed condition of the tray table.

17. The vehicle of claim 14, further comprising an inflatable bag within the steering wheel, wherein the body of the tray table is pivotal upon a force from inflating the inflatable bag.

18. The vehicle of claim 14, wherein the body comprises a plurality of sub-sections substantially parallel to each other, with a first subsection substantially aligned with the first edge, a second subsection substantially aligned with the second edge, and at least one divider positioned between the first and second subsections and the first and second edges.

19. The vehicle of claim 18, wherein the at least one divider enables a length of the body to reduce from the first length to the second length.

* * * * *